(12) United States Patent
Afzal et al.

(10) Patent No.: US 7,504,137 B2
(45) Date of Patent: Mar. 17, 2009

(54) LIMITED PLAY OPTICALLY-READABLE MEDIUM WITH LIQUID CRYSTALS AND METHODOLOGY THEREFOR

(75) Inventors: Robert S. Afzal, Providence, RI (US); Jeffrey Conroy, Rumford, RI (US); Nabil M. Lawandy, North Kingston, RI (US)

(73) Assignee: Flexplay Technologies, Inc., Atlanta, GA (US)

( * ) Notice: Subject to any disclaimer, the term of this patent is extended or adjusted under 35 U.S.C. 154(b) by 541 days.

(21) Appl. No.: 10/510,356

(22) PCT Filed: Apr. 7, 2003

(86) PCT No.: PCT/US03/10668

§ 371 (c)(1), (2), (4) Date: May 9, 2005

(87) PCT Pub. No.: WO03/087886

PCT Pub. Date: Oct. 23, 2003

(65) Prior Publication Data

US 2005/0214681 A1    Sep. 29, 2005

Related U.S. Application Data

(60) Provisional application No. 60/370,463, filed on Apr. 5, 2002.

(51) Int. Cl.
*C09K 19/00*    (2006.01)
*C09K 19/52*    (2006.01)

(52) U.S. Cl. .................. 428/1.1; 430/20; 430/270.1; 252/299.01

(58) Field of Classification Search .............. 430/20, 430/270.1; 252/299.01; 428/1.1
See application file for complete search history.

(56) References Cited

U.S. PATENT DOCUMENTS

| | | | |
|---|---|---|---|
| 5,353,247 | A | 10/1994 | Faris |
| 5,838,653 | A | 11/1998 | Fan et al. |
| 5,925,433 | A | 7/1999 | Dubbeldam et al. |

FOREIGN PATENT DOCUMENTS

| | | |
|---|---|---|
| JP | 63-144433 | 6/1988 |
| JP | 2001-241856 | 9/2001 |

*Primary Examiner*—Geraldina Visconti
(74) *Attorney, Agent, or Firm*—Morris, Manning & Martin, LLP

(57) ABSTRACT

A method and an apparatus are disclosed for limiting the readability of optically-readable medium, wherein a combination of a liquid crystal material and a wavelength shifting material are incorporated into the optically-readable medium. The liquid crystal material is selected to substantially interfere with the reading beam of a reading device. The wavelength shifting material is selected to shift the wavelength at which the liquid crystal interferes with the reading beam so that the reading beam can read the optically-readable medium. A predetermined stimulus causes the liquid crystal material to shift back to a configuration that substantially interferes with the reading beam so that the reading beam can no longer read the content on the optically readable medium.

5 Claims, 4 Drawing Sheets

LIMITED PLAY OPTICALLY-READABLE MEDIUM WITH LIQUID CRYSTALS AND METHODOLOGY THEREFOR

Priority is herewith claimed under 35 U.S.C. § 119(e) from Provisional Patent Application No. 60/370,463, filed Apr. 5, 2002, which is incorporated by reference in its entirety.

FIELD OF THE INVENTION

The present invention is generally directed to limited play optically-readable medium and, more particularly, limited play optically-readable medium with liquid crystals.

BACKGROUND

The popularity of optically-readable media, such as for example, compact discs (CD) and digital versatile discs (also known as digital video discs, or DVD), has grown rapidly since its introduction. When compared to other competitive storage media types, the accessibility of data, fidelity, low manufacturing cost, reduced size and other features have made optically-readable media, such as CDs and DVDs, an overwhelming choice for manufacturers and users alike. As a result, the variety of information stored on optically-readable media is great. Several types of content that are stored on optically-readable media, such as for example copyrighted content, have unique requirements, however, and some common problems exist with distribution of data on current CD and DVD formats.

One of the most well known problems with unlimited use optically-readable media is the piracy of content stored on the optically-readable medium. Piracy results when individuals take advantage of their ability to frequently copy information, such as music or movies. Piracy undermines the value of copyright protection. Schemes that would limit the usable life of optically-readable media would be of great benefit to copyright owners.

One scheme developed to protect copyrights is the development of a limited play optically-readable media. These are optically-readable media that become unreadable after a pre-defined period of time.

Limited play optically-readable media not only benefit the copyright owner but also end users. For example, movie rental stores would be able to issue limited play DVDs that would not have to be returned. This application would reduce DVD rental to a single transaction, as opposed to two separate transactions, thereby reducing expenses and providing opportunities for reduced rental fees.

Additional uses of limited play optically readable media include, for example, trial offerings of music or software. Benefits from such offerings would include market testing, and inducement of subsequent purchases.

Advances in materials science have produced promising materials for the further development of optically-readable media. Liquid crystals are an example of on such material. Liquid crystal materials are a class of materials whose optical properties have been studied at length.

Liquid crystal materials generally have several common characteristics. Among these characteristics are a rod-like molecular structure, strong dipoles and/or easily polarizable substituents.

A distinguishing characteristic of the liquid crystalline state is the tendency of the molecules to point along a common axis, called the director. This is in contrast to molecules in the liquid phase, which have no intrinsic order. In the solid state, molecules are highly ordered and have little translational freedom. The characteristic orientational order of the liquid crystal state is between the traditional solid and liquid phases and this is the origin of the term "mesogenic" state, used synonymously with liquid crystal state. Crystalline materials demonstrate long range periodic order in three dimensions. An isotropic liquid has no orientational order. Substances that are not as ordered as a solid, yet have some degree of alignment are properly called liquid crystals.

The liquid crystal state is a distinct phase of matter observed between the crystalline (solid) and isotropic (liquid) states. There are many types of liquid crystal states (phases) and their characterization depends on the amount of order in the material. Examples of liquid crystal phases are nematic, smectic, and cholesteric.

Liquid crystals are anisotropic materials, and the physical properties of a liquid crystal system varies with the average alignment. If the alignment is large, the material is very anisotropic. Similarly, if the alignment is small, the material is almost isotropic.

An example of a type of liquid crystal material is cholesteric liquid crystals (CLC). CLC's are called CLC's whether they are derived from cholesterols or not and take their name not from the type of material but from the fact that they have a long range twist about the director. CLC's are an intermediate state of matter between a crystal and a liquid. In CLC materials, the geometrically anisotropic molecules are arranged in layers with their long molecular axes parallel to one another in one plane and displaced incrementally in successive layers to give a helical type of stacking. Cholesteric liquid crystals are helical with the length of the helix comparable to the wavelength of light (for example, 350 nm to 750 nm). An important characteristic of the cholesteric mesophase is the pitch. The pitch is defined as the distance it takes for the director to rotate one full turn in the helix. A by-product of the helical structure of the chiral nematic phase, is its ability to selectively reflect light of wavelengths equal to the pitch length, so that a color will be reflected when the pitch is equal to the corresponding wavelength of light in the visible spectrum. Altering the pitch length results in an alteration of the wavelength of reflected light. If the angle at which the director changes is made larger the pitch length tightens. The wavelength of the reflected light can also be controlled by adjusting the chemical composition, since cholesterics can either include exclusively chiral molecules or nematic molecules with a chiral dopant dispersed throughout. The dopant concentration can be used to adjust the chirality and thus the pitch length.

The liquid crystals selectively reflect polarized light of wavelengths equal to the helix pitch length, so that a color will be reflected when the pitch is equal to the corresponding wavelength of light in the visible spectrum. The polarization reflected is related to the helicity of the CLC. Cholesteric liquid crystals are known to be sensitive to temperature and pressure. That is, as the temperature of the crystal increases so does the pitch of the helix and so does its color. Specifically, it is known that an increase in temperature corresponds to a longer wavelength (red light) reflected so that the observed color changes from red to blue.

SUMMARY OF THE PREFERRED EMBODIMENTS

The foregoing and other problems are overcome, and other advantages are realized, in accordance with the presently preferred embodiments of these teachings.

This invention provides a method for limiting the number of times that an optically readable medium, such as for example a compact disc or digital video disc, may be read.

This invention also provides a limited use mechanism within an optically-readable medium that limits the number of times the medium may be read.

In accordance with one aspect of the invention, a limited play optically-readable medium is provided with a cholesteric liquid material anywhere along the optical path traversed by the reading beam. The limited play optically-readable medium includes a substrate, a reflective layer coupled to the substrate layer and a cholesteric liquid crystal material, wherein the cholesteric liquid crystal material is anywhere along the optical path traversed by the reading beam. In accordance with one embodiment, the limited play optically-readable medium further includes a wavelength shifting material in communication with the cholesteric liquid crystal material. In yet another embodiment at least two cholesteric liquid crystal materials are anywhere along the optical path traversed by the reading beam, wherein the first cholesteric crystal material substantially interferes with left-handed circularly polarized light of a predetermined wavelength and the second cholesteric crystal material substantially interferes with right-handed circularly polarized light of a predetermined wavelength.

In another aspect of the invention, a limited play optically-readable medium is provided with a cholesteric liquid material in the bonding layer. The limited play optically-readable medium includes a substrate, a bonding layer coupled to the substrate layer, and a reflective layer coupled to the bonding layer, and a cholesteric liquid crystal material included in the bonding layer. In accordance with one embodiment, the limited play optically-readable medium further includes a wavelength shifting material in communication with the cholesteric liquid crystal material. In yet another embodiment at least two cholesteric liquid crystal materials are anywhere along the optical path traversed by the reading beam, wherein the first cholesteric crystal material substantially interferes with left-handed circularly polarized light of a predetermined wavelength and the second cholesteric crystal material substantially interferes with right-handed circularly polarized light of a predetermined wavelength.

In accordance with another aspect of the invention, a method is provided for making a limited play optically-readable medium. The method includes encoding a substrate layer with optically-readable content, coupling a reflective layer to the substrate layer, disposing a cholesteric liquid crystal material in the optical path traversed by the reading beam, and disposing a wavelength shifting material in communication with the cholesteric liquid crystal material.

In anther aspect of the invention, a limited play optically-readable medium is provided with a cholesteric liquid crystal material coated on the external surface of the limited play optically-readable medium. The limited play optically-readable medium includes a substrate layer, a reflective layer, and a cholesteric liquid crystal material coated on the external surface of the substrate layer. In accordance with one embodiment, the limited play optically-readable medium further includes a wavelength shifting material in communication with the cholesteric liquid crystal material. In yet another embodiment at least two cholesteric liquid crystal materials are anywhere along the optical path traversed by the reading beam, wherein the first cholesteric crystal material substantially interferes with left-handed circularly polarized light of a predetermined wavelength and the second cholesteric crystal material substantially interferes with right-handed circularly polarized light of a predetermined wavelength.

In a further embodiment of the present invention, a data storage device is provided. The data storage device includes a first substrate and a second substrate, wherein in at least the first substrate has defined thereon a plurality of pits and lands covered by a reflective material; a bonding layer between the first and second substrates; and a coating between at least one of the surfaces of the first and second substrates and the bonding layer wherein the coating includes a cholesteric liquid crystal material. In accordance with one embodiment, the data storage device further includes a wavelength shifting material in communication with the cholesteric liquid crystal material. In yet another embodiment at least two cholesteric liquid crystal materials are anywhere along the optical path traversed by the reading beam, wherein the first cholesteric crystal material substantially interferes with left-handed circularly polarized light of a predetermined wavelength and the second cholesteric crystal material substantially interferes with right-handed circularly polarized light of a predetermined wavelength.

In accordance with another aspect of the invention, a method is provided for limiting the readability of an optically-readable medium. The method includes selecting a cholesteric liquid crystal material that substantially interferes with light of a predetermined wavelength, selecting a wavelength shifting material, disposing the selected cholesteric liquid crystal material in communication with the optically-readable medium in the optical path of the optically-readable medium reading device, and disposing the wavelength shifting material in communication with the cholesteric liquid crystal material.

These and other features and aspects of the present invention will become readily apparent from the following detailed description wherein embodiments of the invention are shown and described by way of illustration of the best mode of the invention. As will be realized, the invention is capable of other and different embodiments and its several details may be capable of modifications in various respects, all without departing from the invention. Accordingly, the drawings and descriptions are to be regarded as illustrative in nature and not in a restrictive or limiting sense.

BRIEF DESCRIPTION OF THE DRAWINGS

The invention is pointed out with particularity in the appended claims. The advantages of the invention described above, as well as further advantages of the invention, are better understood by reference to the following detailed description taken in conjunction with the accompanying drawings, in which:

DETAILED DESCRIPTION

Figure 1:
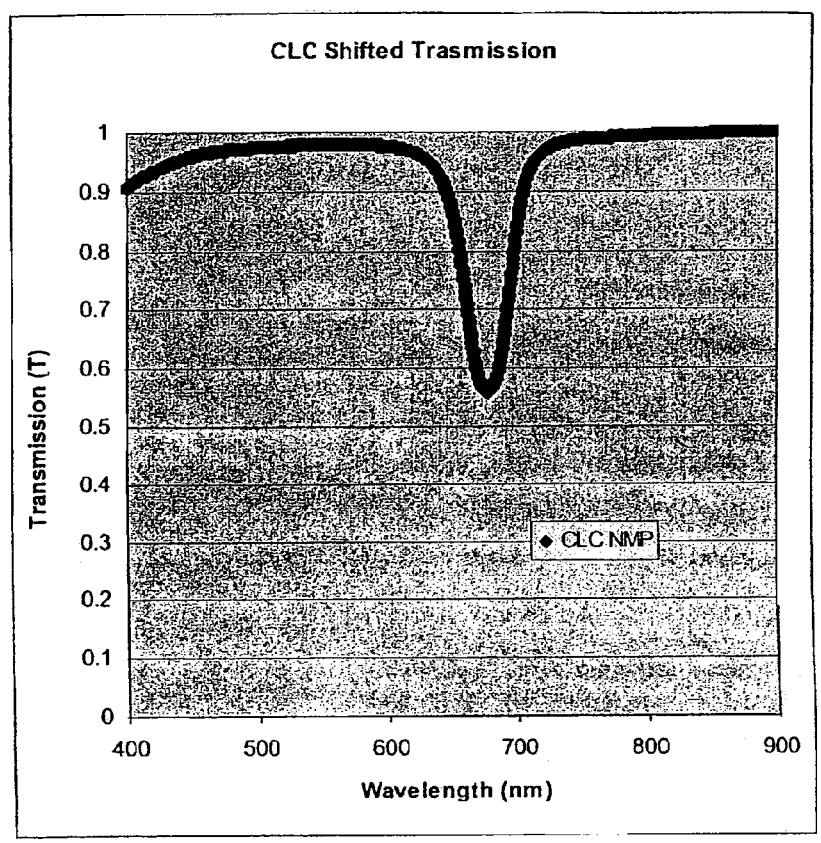
FIG. 1 is a graphic depiction of the transmissivity of a cholesteric liquid crystal system in combination with the solvent NMP using a light source that is unpolarized in accordance with some embodiments of the invention.

Disclosed herein are methods and apparatus for limiting the readable life of an optically-readable medium. The embodiments disclosed herein are illustrative of this invention for limiting the readable life of optically-readable medium, and should not be considered limiting of the invention. One skilled in the art will recognize that variations from the described embodiments may be realized, and that such variations are within the teachings of this invention.

The invention applies liquid crystal materials to an optically-readable medium to provide a limited play optically-readable medium. The liquid crystal material can be placed anywhere on and/or within an optically-readable medium so long as the liquid crystal material is along the optical path traveled by the reading beam of an optically-readable medium reading device. For example, the liquid crystal material can be coated on the unbounded surface side of an optically-readable medium. Alternatively, the liquid crystal material can be placed in, for example, the bonding layer, or between substrate layers or the substrate and reflective layer, or any combination of the above.

EXAMPLE 1

Cholesteric Liquid Crystal System

One embodiment of the invention employs a cholesteric liquid crystal (CLC) material that is applied to the read surface of optically-readable medium. Factors that govern the CLC material selected for an application include, but are not limited to, the operational wavelength band of the reading beam of the reading device for the optically-readable medium.

The CLC material may be applied to the optically-readable medium, for example, a disc, in a variety of ways, including but not limited to, spin coating followed by a curing or polymerization step. The CLC material may be applied to the optically-readable medium at various stages, including but not limited to, manufacture of the DVD or during post-production.

A wavelength shifting material is also applied to the optically-readable medium. The wavelength shifting material serves to shift the reflection wavelength band so it does not interfere with the readout system, thereby permitting data stored on the optically-readable medium to be read from the optically-readable medium as it is played. The shifting material may include, but is not limited to, an evaporative solvent or a material that dissipates through sublimation.

For example, a limited play DVD is prepared through application of a cholesteric liquid crystal (CLC) material during the manufacturing or post-production process. The CLC material is selected to reflect at the wavelength employed by the reading beam—in this example the reading beam in a DVD system, which is in the range of 630 nm to 650 nm. A wavelength shifting material is added to the limited play DVD along with the cholesteric liquid crystal material. The wavelength shifting material shifts the wavelength the CLC material substantially interferes with the reading beam for a predetermined period of time. A subsequent event causes the wavelength shifting material to lose its ability to shift the wavelength at which the CLC material interferes with the reading beam. The CLC material returns to a state that substantially interferes with the reading beam in the range of 630 nm to 650 nm and the content on the DVD becomes unreadable.

In another embodiment, two coatings or types of CLC material are applied to the optically-readable medium. The second coating accounts for the fact that the read lasers for a number of optical medium reading devices are typically circularly polarized. This embodiment ensures that either handedness of the circularly polarized light, or unpolarized light, in a particular range is completely reflected.

An example of where CLC materials can be obtained from is CHELIX at 520 Mercury Drive, Sunnyvale, Calif. 94085.

EXAMPLE 2

Solvent as Wavelength Shifting Material

In addition to the CLC material, a shifting material is applied to the optically-readable medium. In one embodiment, a solvent such as N-methyl-2-pyrrolidone (NMP) is applied over the coating of CLC material on an optically-readable medium. After the NMP solvent has been applied to the optically-readable medium, for example DVD, coated with the CLC material, a shift of approximately 166 nm in the reflection wavelength of the CLC material occurs, permitting a DVD to be read in a typical DVD player. Over time, the NMP evaporates, and the reflection wavelength of the CLC material shifts back toward the wavelength of the readout light in the DVD player. After some portion of the NMP has dissipated, the reflection wavelength of the CLC material has shifted substantially, such that the DVD is no longer readable in a DVD player, as the DVD readout laser light is reflected by the layer of CLC material.

In another embodiment, the shifting material commences to dissipate once heated with the readout laser. In this embodiment, the optically-readable medium is unreadable after a specific number of read cycles have occurred.

EXAMPLE 3

DVD Application

Figure 2:
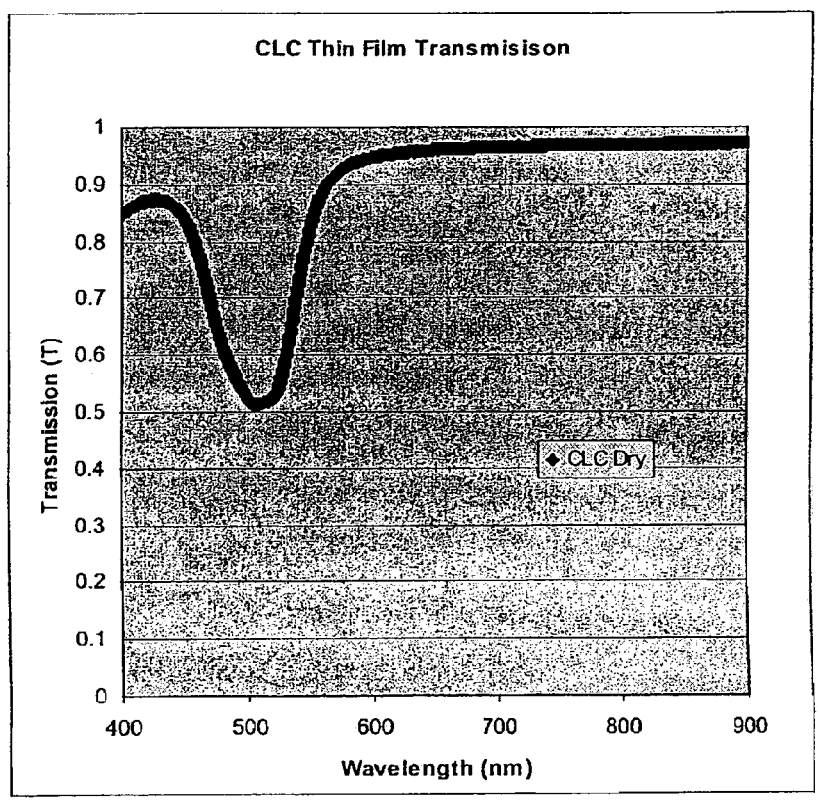
FIG. 2 is a graphic depiction of the transmissivity of the cholesteric liquid crystal system depicted in FIG. 1 without the solvent NMP using a light source that is unpolarized in accordance with some embodiments of the invention.

FIGS. 1 and 2, when taken together, describe the shift in reflection wavelength that occurs with the evaporation of the example solvent NMP from a CLC material for unpolarized light.

FIG. 1 illustrates the reflectivity of the combination of CLC material designed for a DVD system, and the solvent NMP. This graph shows a peak in the reflectivity of the combination of materials at a wavelength of 680 nm.

FIG. 2 depicts the CLC material selected for a DVD system without the solvent NMP. This figure shows that the peak reflection wavelength of the CLC material alone is approximately 514 nm, or about 166 nm. lower than the reflection wavelength of the CLC material and NMP combination.

Figure 3:
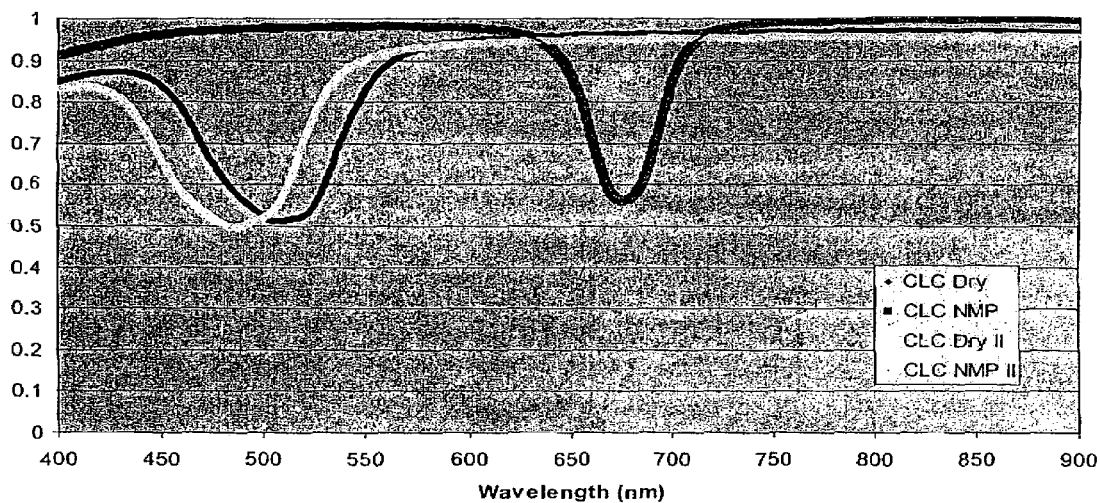
FIG. 3 is a graphic depiction showing the repeatability of the shift in reflection wavelength depicted by FIG. 1 and FIG. 2 in accordance with some embodiments of the invention.

FIG. 3 is a graphic illustration of the reproducibility of the shift in the reflectance wavelength. As the DVD containing CLC material is again exposed to NMP, the reflection wavelength of the DVD is restored to within the range of the typical DVD player.

Figure 4:
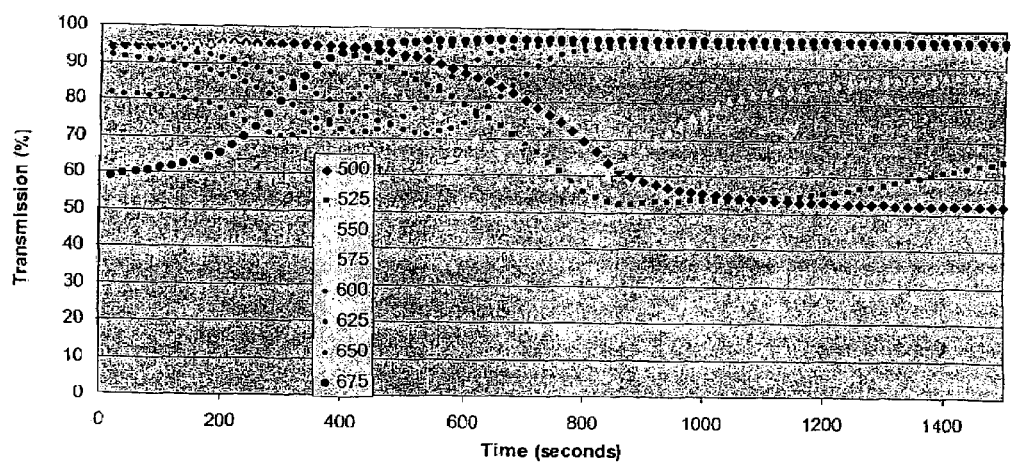
FIG. 4 is a graphic depiction showing the spectral shift in reflections from a cholesteric liquid crystal material and NMP combination as a function of NMP evaporation time in accordance with some embodiments of the invention.

FIG. 4 shows the spectral shift over time as the NMP evaporates from the sample DVD.

Figure 5:
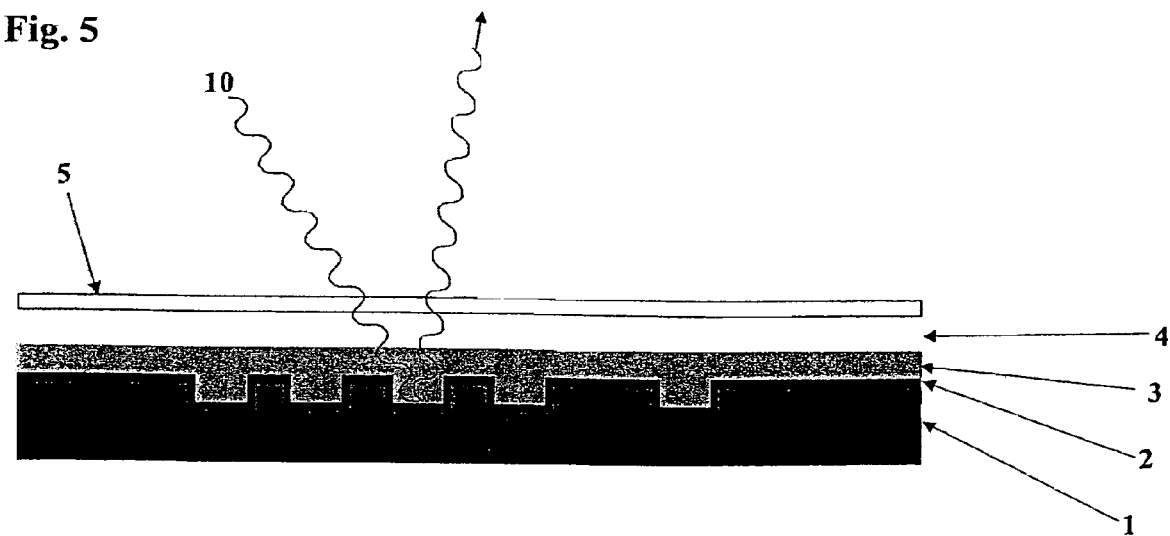
FIG. 5 is a schematic diagram of an optically-readable medium coated with a single application of CLC and a wavelength shifting material in accordance with some embodiments of the invention.
Figure 6:
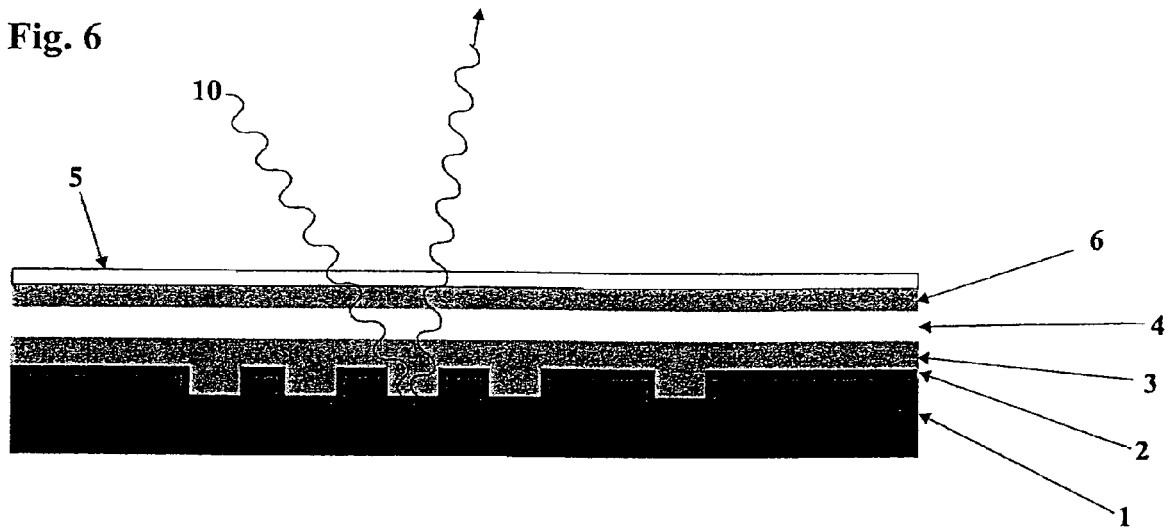
FIG. 6 is a schematic diagram of an optically-readable medium coated with two applications of CLC and a shifting material in accordance with some embodiments of the invention.
Figure 7:
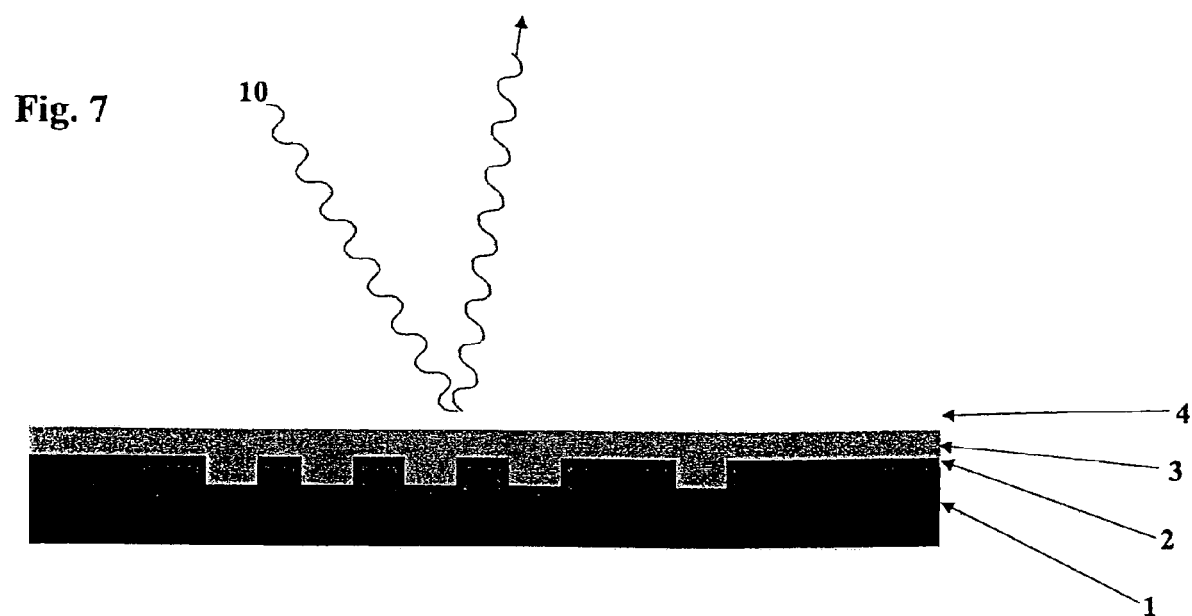
FIG. 7 is a schematic diagram of an optically-readable medium coated with a single application of CLC where the shifting material has substantially dissipated, and the incident light from the readout mechanism is thereby reflected away from the data portion of the medium in accordance with some embodiments of the invention.

FIGS. 5-7 show various embodiments of this invention. FIG. 5 is a schematic diagram of a digital optical medium coated with a single application of CLC, and a shifting material. FIG. 5 shows layers in a typical digital optical medium, comprised of a substrate 1, a reflective layer 2 with surface features, and a transparent cover layer 3. In the embodiment shown in FIG. 5, an application of CLC material 4 is shown layered on top of the protective transparent cover layer 3. The shifting material 5 is shown layered over the CLC material 4. Light 10 from the optical medium readout mechanism is shown. In FIG. 5, where both the CLC material 4 and the shifting material 5 are in place, the readout light 10 penetrates the various layers and reflects off of the reflective layer 2, thus enabling the readout mechanism to interpret the data contained in the optically-readable medium.

FIG. 6 shows an embodiment that is similar to the embodiment shown in FIG. 5, except that an additional layer 6 of CLC material is shown. In this embodiment, the additional layer 6 provides for assurance of reflection of a circularly polarized readout laser, once the shifting material 5 has dissipated.

FIG. 7 shows the invention, once the shifting material 5 has dissipated. In this embodiment, the light 10 from the readout laser is reflected by the CLC material 4. The CLC material 4, which is tuned to reflect light 10 within the band of wavelengths emitted by the readout laser, adequately reflects the light 10 in the absence of the shifting material 5, thus preventing further access to the data contained in the reflective layer 2.

EXAMPLE 4

Location of CLC Material on Optically-Readable Medium

In a further embodiment, the CLC material and shifting material is introduced to only a portion of the optically-readable medium. In this embodiment, once the shifting material has dissipated, or substantially dissipated, it is no longer possible to read a critical portion of the optically-readable medium, including but not limited to, a file allocation table, directory, control data, and/or table of contents. Alternatively, the entire data encoded area can have the CLC placed adjacent to it or in actual contact with it.

EXAMPLE 5

Alternative Wavelength Shifting and Wavelength Return Mechanisms

In another embodiment, the CLC material is located somewhere between the polycarbonate substrates, either as a component within the bonding agent or as a separate layer adjacent to the bonding layer. In this embodiment, the wavelength shifting mechanism can be the introduction of an external stimulus that will cause a change in the CLC composition that will prevent the reading laser from accessing the encoded content. External stimuli may include, for example, oxygen, humidity, or the photochemical or thermal energy of the reading laser itself, as has been previously described.

In particular, oxygen could be used to change the state of the CLC material by an interaction or oxidation of a chiral dopant material that is used to control the helical twist of the mixture. The resultant oxidized CLC mixture would then interfere with the wavelength of the reading beam so that the data is no longer readable. Alternatively, oxygen could be used to affect the CLC material itself. Another method would be the addition of a third component, which after exposure to oxygen, would attack either the chiral dopant or the CLC materials. Blocking groups could be used on either the chiral dopant or the third component such that discs could be made in air, and after a certain deblocking time would revert the blocked components to the oxidizable species.

EXAMPLE 5

Application to Blu-Ray Systems

CLC material can be used as a thick top coat layer in a blu-ray disk. Blu-ray disks are optically-readable medium that are read using a blue violet laser. The Blu-ray Disc enables the recording, rewriting and play back of up to 27 gigabytes (GB) of data on a single sided single layer 12 cm CD/DVD size disc using a 405 nm blue-violet laser. The companies that established the basic specifications for the Blu-ray Disc are:

Hitachi Ltd., LG Electronics Inc., Matsushita Electric Industrial Co., Ltd., Pioneer Corporation, Royal Philips Electronics, Samsung Electronics Co. Ltd., Sharp Corporation, Sony Corporation, and Thomson Multimedia.

By employing a short wavelength blue violet laser, the Blu-ray Disc successfully minimizes its beam spot size by making the numerical aperture (NA) on a field lens that converges the laser 0.85. In addition, by using a disc structure with a 0.1 mm optical transmittance protection layer, the Blu-ray Disc diminishes aberration caused by disc tilt. This also allows for disc better readout and an increased recording density. The Blu-ray Disc's tracking pitch is reduced to 0.32 um, almost half of that of a regular DVD, achieving up to 27 GB high-density recording on a single sided disc.

Because the Blu-ray Disc utilizes global standard "MPEG-2 Transport Stream" compression technology highly compatible with digital broadcasting for video recording, a wide range of content can be recorded. It is possible for the Blu-ray Disc to record digital high definition broadcasting while maintaining high quality and other data simultaneously with video data if they are received together.

The Blu-ray Disc is a technology platform that can store sound and video while maintaining high quality and also access the stored content in an easy-to-use way. This will be important in the coming broadband era as content distribution becomes increasingly diversified.

In this embodiment, any of the above-described mechanisms for pitch length changes of the liquid crystal material may be utilized.

CONCLUSION

While described in the context of a DVD or a CD, the teachings of this invention are applicable to other types of optically-readable medium. These teachings are not to be construed as limited to protection of information subject to copyright protection.

Neither are these teachings to be construed as limiting to only the specific materials as disclosed above, nor to the specific processes disclosed above. For example, the shifting material may dissipate through sublimation as opposed to evaporation. Additionally, the invention is not limited to cholesteric liquid crystals, but instead includes, liquid crystals generally. The person skilled in the art will recognize that other materials may be selected as appropriate, and methods of application of materials may vary from the teachings herein.

What is claimed is:

1. A limited play optically-readable medium comprising:
a substrate;
a reflective layer coupled to said substrate layer; wherein said substrate comprises one or more layers through which a reading beam of an optically readable medium reading device passes before impinging on the reflective layer;
at least one cholesteric liquid crystal material in the optical path of the reading beam; and
a wavelength shifting material in communication with said cholesteric liquid crystal material, said shifting material shifts the reflection wavelength band of said least one cholesteric liquid crystal in response to a predetermined stimulus to permanently and irreversibly limit the number of times the medium can be read.

2. The limited play optically-readable medium according to claim 1, wherein said wavelength shifting material is a volatile material.

3. The limited play optically-readable medium according to claim 1, wherein said wavelength shifting material is an oxidizable chiral dopant.

4. The limited play optically-readable medium according to claim 1, wherein said predetermined stimulus comprises at least one of evaporation or sublimation of said shifting material.

5. The limited play optically-readable medium according to claim 1, wherein said predetermined stimulus comprises at least one of oxygen, humidity, photochemical energy, thermal energy, or combinations thereof.

* * * * *